March 8, 1960  G. PFEIFER  2,927,433
HYDRAULIC MASTER CYLINDER

Filed March 25, 1957  2 Sheets-Sheet 1

INVENTOR.
GUNTHER PFEIFER
BY
William D. Hickey
ATTORNEY

March 8, 1960 G. PFEIFER 2,927,433
HYDRAULIC MASTER CYLINDER
Filed March 25, 1957 2 Sheets-Sheet 2

INVENTOR.
GUNTHER PFEIFER
BY
William P. Hickey
ATTORNEY

United States Patent Office 2,927,433
Patented Mar. 8, 1960

2,927,433

HYDRAULIC MASTER CYLINDER

Gunther Pfeifer, South Bend, Ind., assignor to Bendix Aviation Corporation, South Bend, Ind., a corporation of Delaware Application March 25, 1957, Serial No. 648,285

2 Claims. (Cl. 60—54.6)

The present invention relates to actuating systems for fluid pressure motors, and more particularly to master cylinders for automotive braking systems and the like.

An object of the present invention is the provision of a new and improved hydraulic braking system, the actuating portion of which may be sized to provide sufficient displacement to actuate the brake applying fluid pressure motor under normal conditions with a single stroke of the master cylinder, but which actuating portion has positive means for assuring that additional fluid will be supplied the brake applying fluid pressure motors upon a quick release and re-application of the master cylinder.

Another object of the invention is the provision of a new and improved hydraulic braking system having means which will quickly retract the master cylinder's fluid displacement member while restricting return flow of fluid from the wheel cylinders sufficiently to pull a fresh supply of hydraulic fluid into its pressurizing chamber from a compensating reservoir in an amount equal to approximately one-half of the master cylinder displacement; and which will thereafter discharge this additional fluid to the brake applying motors during and immediately following re-application of the master cylinder.

A still further object of the invention is the provision of a new and improved master cylinder, and more particularly a power operated master cylinder, of the above described type having means for assuring that a successive quick release and re-application of the system's actuating lever will deliver additional pressure fluid to the brake applying cylinders in an amount equal to approximately one-half of the master cylinder's displacement even during changing temperature and viscosity conditions of the hydraulic fluid.

A still further object of the invention is the provision of a new and improved braking system of the above described type which is simple in design, reliable and efficient in its operation, and inexpensive to manufacture.

The invention resides in certain constructions and combinations and arrangements of parts, and further objects and advantages will become apparent to those skilled in the art to which the invention relates from the following description of the preferred embodiments described with reference to the accompanying drawings forming a part of this specification, and in which.

Figure 1:
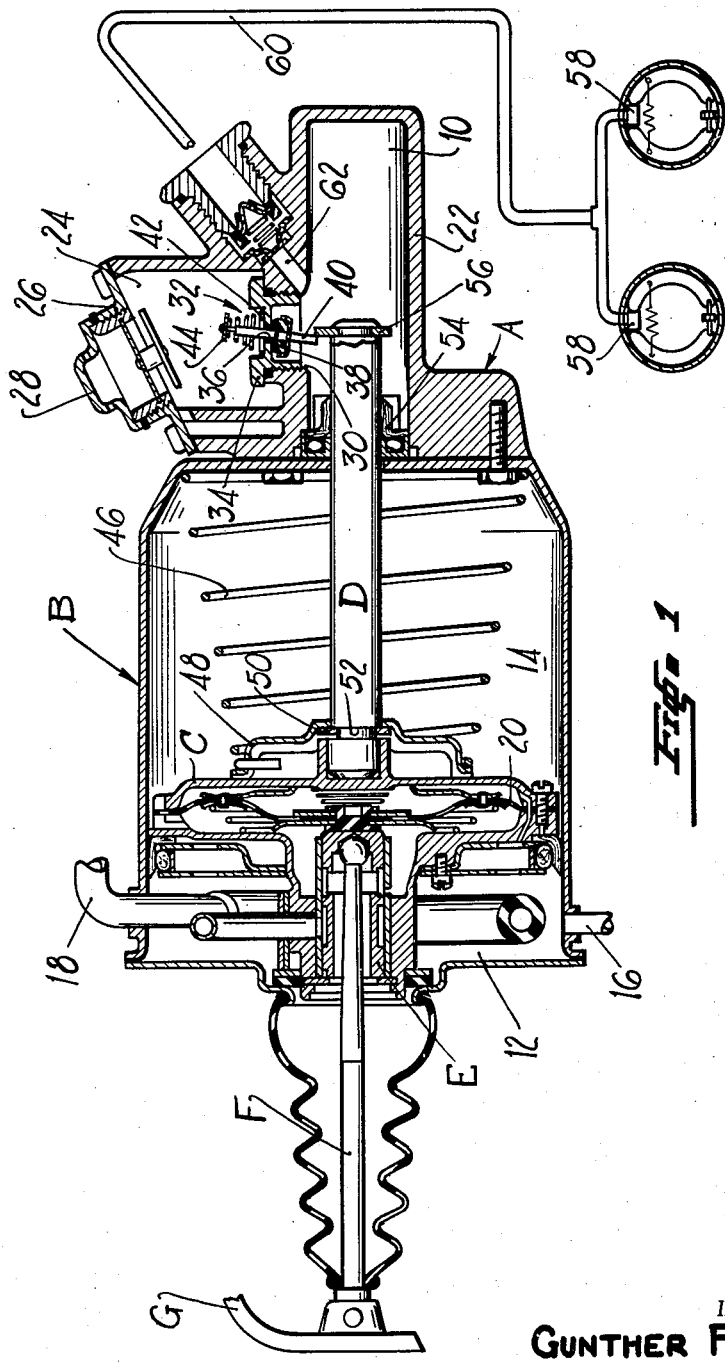
Figure 1 is a cross-sectional view of a power operated master cylinder embodying the principles of the present invention, together with a schematic arrangement of the remaining portion of an automotive braking system.

The power operated master cylinder shown in Figure 1 generally comprises a hydraulic master cylinder A fastened to one end of a power cylinder B having a power piston C therein which is operatively connected to one end of a fluid displacement member D. The opposite end of the fluid displacement member D projects through a suitable opening in the end of the power cylinder into the fluid pressure chamber 10 of the master cylinder A. The power piston C divides the power chamber B into opposing fluid pressure chambers 12 and 14. Movement of the power piston is controlled by means of a control valve E mounted upon the forward face of the piston C—which control valve is in turn controlled by the push rod F, and pedal lever G only a portion of which is shown. The servo motor unit attached to the master cylinder A, is what is called an atmospheric submerged unit. Atmospheric pressure admitted to the forward opposed fluid pressure chamber 12 by the atmospheric connection 16 is also supplied to the rear opposing chamber 14 through the control valve structure E during the de-energizing condition of the servo motor. Actuation of the unit is produced by depressing the foot pedal lever G, whereupon the control valve E admits vacuum from the vacuum connection 18 to the rear opposing chamber 14 to produce differential pressure across the power piston C, and thereby force the fluid displacement member D into the master cylinder A. Power piston C is also provided with a reaction diaphragm 20 whose purpose is to sense the differential pressure being applied across the power piston C, and transmit a smaller but proportional return force to the foot of the operator actuating the unit. The details of the servo motor construction so far described form no part of the present invention and will not be described in detail. For a more complete explanation of the servo motor construction and operation, reference may be had to the Earl R. Price application 411,386, now Patent No. 2,818,710, issued January 7, 1958.

Prior to the present invention, there have been no positive and reliable braking systems with which applicant is familiar, which would assure that a sizable amount of additional fluid would be delivered to a brake cylinder during a quick retraction of the foot pedal lever and a subsequent reapplication of the brakes. Prior systems have incidentally provided some resistance to return flow to the master cylinder through the fluid brake lines and back pressure valve, but the amount of additional fluid which could be added by any re-application of the brakes has been so small and has varied so greatly with temperature changes that pumping action in these systems could not be relied upon to actuate the vehicle brakes. What has been said above is of course true for manually actuated master cylinders, and this effect is even more pronounced in a power operated master cylinder where the internal friction of the power unit greatly reduces the speed at which its hydraulic piston is retracted.

The master cylinder of the present invention is so constructed and arranged as to assure that approximately one-half of the master cylinder displacement will be positively introduced into the master cylinder upon a quick retraction of the foot pedal lever and an immediate re-application of the vehicle brakes. The master cylinder A shown in the drawing generally comprises an integrally cast body member 22 containing the fluid pressure chamber 10 and a reservoir 24 positioned above the fluid pressure chamber. The upper end of the reservoir 24 is provided with a cover plate 26 having a removable plug 28 therein to permit the ready addition of fluid to the braking system. A threaded opening 30 is provided between the reservoir 24 and fluid pressure chamber 10, and a fluid compensating tilt valve structure 32 is screwed into the opening to control fluid communication between the reservoir and the fluid pressure chamber. The tilt valve structure 32 is formed by means of plug 34 having an opening 36 therein through which communication is provided. The opening 36 is adapted to be closed off by an annular rubber faced disc 38 mounted upon a stem 40 projecting upwardly through the opening 36 and which disc is adapted to abut the bottom surface of the plug 34. A coil spring 32 is positioned between the top of the plug 34 and a spring retaining washer 44 riveted to the top end of the stem 40 in such manner that the disc 38 will close off the opening 36 under the unhampered centering action of the spring 42.

In the normal de-energized condition of the servo motor, the fluid displacement member D and the power piston C are biased to their retracted positions by means of a power piston return spring 46 interpositioned between the bottom of the power cylinder B and an abutment plate 48 positioned about the fluid displacement member D against a snap ring 50 seated in a groove 52 adjacent the power piston C. A hydraulic seal 54 is provided between the fluid displacement member D and the forward end of the fluid pressure chamber 10; and a radially projecting washer 56 is riveted to the end of the fluid displacement member D within the fluid pressure chamber 10 in such a manner as to contact the stem 40 of the tilt valve structure 32 when the fluid displacement member D approaches its retracted position. Abutment of the washer 56 with the stem 40 rocks or tilts the valve closure member 38 out of engagement with the surfaces of the plug 34 to permit communication between the reservoir 24 and fluid pressure chamber 10. Inward movement of the fluid displacement member D from its retracted position will of course permit the stem 40 to assume a vertical position, and the valve closure member 38 to close the opening 36. Further inward movement of the fluid displacement member D will thereafter develop pressure within the fluid pressure chamber 10. Pressure developed within the fluid displacement chamber 10 is conducted to the brake applying fluid pressure motors 58 through the discharge connection 62 and the interconnecting brake lines 60.

Conventional hydraulic braking systems usually employ hydraulic tubing of such an internal diameter as to offer a slight amount of resistance to return flow of hydraulic fluid from the wheel cylinders to the master cylinder. The amount of resistance offered varies greatly with changes in viscosity and thus ambient temperature, and is usually of such a minor nature that a quick retraction of the fluid displacement member D will cause most of the fluid previously delivered to the wheel cylinders to be drawn back into the master cylinder. In such systems rapid pumping of the master cylinder will usually cause some additional fluid to be supplied to the wheel cylinders; but the certainty of results, and amount of additional fluid supplied will not permit this expediency to be used in anything approaching a reliable operation.

According to further principles of the present invention positive means are provided for restricting backflow from the wheel cylinders to such a degree that the master cylinder, when permitted to quickly assume its retracted position, will develop sufficient negative pressure within the master cylinder so as to permit additional fluid to be sucked into the master cylinder by an amount approaching approximately one-half of the master cylinder's displacement. This means must offer very little resistance to fluid flow from the master cylinder to the wheel cylinders, and must be sized large enough to avoid restricting return flow to such a degree as will produce a dragging of the brakes during normal operation of the vehicle. This means will also preferably be of such a nature that its resistance to return flow will not vary appreciably with changes in viscosity of the hydraulic brake fluid.

The braking system shown in Figure 1 employs a check valve structure and a sharp edge flow restricting orifice for accomplishing the above mentioned results. The inclined discharge connection of the master cylinder is counterbored from its outer end to provide two spaced shoulders 64 and 66 in the inner end of the counterbore. A generally square shaped disc is seated against the shoulder 64 and a centrally located opening 70 extends therethrough to form a flow restriction for return flow through the discharge connection 62. The disc 68 is retained within the bottom portion 72 of the counterbore by means of an annular washer 74 positioned against the outer shoulder 66, which washer is in turn held in place by means of a coil spring 76. The master cylinder is also provided with a back pressure valve adapted to offer very little resistance to flow from the master cylinder to the wheel cylinders, but which will hold a predetermined pressure on the wheel cylinders and the interconnecting brake lines attached to the master cylinder. The back pressure valve shown in the drawings comprises a flanged conically shaped member 80 positioned in the discharge connection and held in place by means of a threaded tubing adapter 82 screwed into the outer end of the discharge connection. Suitable openings 84 are provided in the inclined portions of the conically shaped member 80 to permit substantially unrestricted flow out of the master cylinder. An annular rubber facing or flap 86 is provided on the outer surface of the conically shaped member 80 in a manner covering the openings 84 and at the same time providing a rubber seat which may be biased against the inner end of the tubing adaptor 82 to form a seal therewith. The conically shaped member is held into engagement with the tubing adaptor 82 by means of the coil spring 76 which is suitably sized so as to maintain a predetermined back pressure upon the system to which the master cylinder is connected. Pressure against the outer surface of the conically shaped member 80 forces the flaps 86 firmly against the conically shaped member 80 to seal off the openings 84. Pressure in excess of the desired amount produces a yielding of the coil spring 76 to permit the back pressure valve to be moved out of engagement with the tubing adaptor 82 thereby permitting return flow around the outer edges of the conically shaped member 80 to the master cylinder through the centrally located opening 70 of the check valve 68.

Normal operation of the braking system shown in Figure 1 is initiated by the depressing of the foot pedal lever G, whereupon the push rod F moves the control valve structure E to a position admitting vacuum to the power chamber 14. Pressure differential produced across the power piston causes the fluid displacement member D to move inwardly into the fluid pressure chamber 10. Initial movement of the fluid displacement member D permits the stem 40 of the fluid compensating valve to assume a vertical position wherein the valve closure member 38 closes off the opening 36 to prevent further communication between the fluid pressure chamber 10 and the reservoir 24. Continued inward movement of the fluid displacement member D causes fluid to be displaced from the pressure chamber 10 lifting the square shaped disc 68 from engagement with its shoulder 64. Fluid flow proceeds out around the four segmental areas around the outer edges of the disc through the opening in the annular washer 74, to the openings 84 in the back pressure valve 78. Flow out through the back pressure valve lifts the rubber facing 86 from the outer surface of the conically shaped member 80 to permit substantially unrestricted flow to proceed to the wheel cylinders 58 of the vehicle. It has previously been mentioned that the master cylinder A has been provided with a fluid displacement approximately one-half that of conventional braking systems—or stated in another way, has a displacement equal to approximately three times the quantity required to operate the vehicle brakes when the system including the brake shoes is properly adjusted. Normal operation of the brakes therefore will be completed by a single application of the foot pedal lever G. Retraction of the foot pedal lever G permits the pressure within the master cylinder 10 to decrease below that previously supplied to the wheel cylinders 58, whereupon shoe retracting springs (not shown) in the individual wheel assemblies forces fluid to be returned from the wheel cylinders 58 through the interconnecting lines 60 to the back pressure valve 78. This pressure will be sufficient to force the conically shaped member 80 out of engagement with the tubing adaptor 82 to permit the fluid to proceed around the outer edges of the conically shaped member 80 to the centrally located opening 70 in the check valve or square shaped disc 68. The resistance to flow offered by the opening 70 in conjunction with the throttling effect produced by the back pressure valve 78 restricts the return flow to the master cylinder A by an amount causing the return flow to take place over a predetermined interval of time. The interconnecting brake lines 60 will preferably be sized large enough such that the restriction to return flow offered by the lines will not appreciably affect this time interval under changing viscosity conditions; and this time interval will preferably be short enough to avoid undue dragging of the vehicle brakes when the foot pedal lever G is released and the accelerator depressed to accelerate the vehicle.

If during some abnormal condition of the braking system a single stroke of the foot pedal lever does not produce sufficient displacement to operate the brakes of the vehicle, the brake pedal may be quickly released and re-applied to deliver additional fluid to the vehicle wheel cylinders. The length of time required for the hydraulic fluid to return from the wheel cylinders 58 past the back pressure valve 78 and the flow restricting plate 68 is sufficiently long and the power piston return spring 46 is sufficiently strong to cause the fluid displacement member D to produce a negative pressure within the fluid pressure chamber 10 with respect to the reservoir 24. When the foot pedal lever G is quickly released, the amount of negative pressure developed will be sufficient to suck open the compensating valve 38 and cause an additional amount of fluid to enter the fluid pressure chamber 10 from the reservoir in an amount approximating one-half of the fluid pressure chamber's displacement. If the radially extending washer 56 is not subsequently brought into engagement with the stem 40, the additional fluid so supplied will remain in the master cylinder until such time as the brakes are either again applied or the foot pedal G is permitted to be fully released. Complete release of the foot pedal lever G will however produce an opening of the compensating valve 32, and unless the foot pedal lever E is again quickly applied, the return flow from the wheel cylinders 58 will force the additional fluid added by the negative pressure back into the reservoir 24. The operator will normally be able to tell when the foot pedal lever G and thus the fluid displacement member D has reached its fully retracted position and a quick re-application of the brakes thereafter will permit the fluid compensating valve 32 to close and an additional amount of fluid approximating one-half of the master cylinder's original displacement to be supplied to the wheel cylinders 58. It will thus be seen that even though a slow leak in the braking system should occur or fade or some other abnormal condition should arise, positive means are provided whereby sufficient additional displacement is provided by the next application of the brakes to adequately brake the vehicle.

Figure 2:
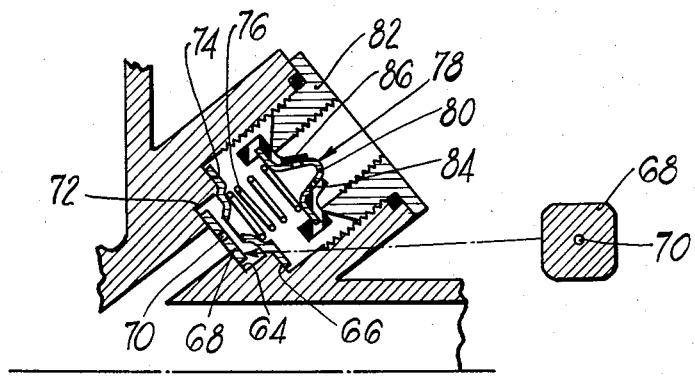
Figure 2 is an enlarged fragmentary view of a portion of the master cylinder shown in Figure 1.
Figure 3:
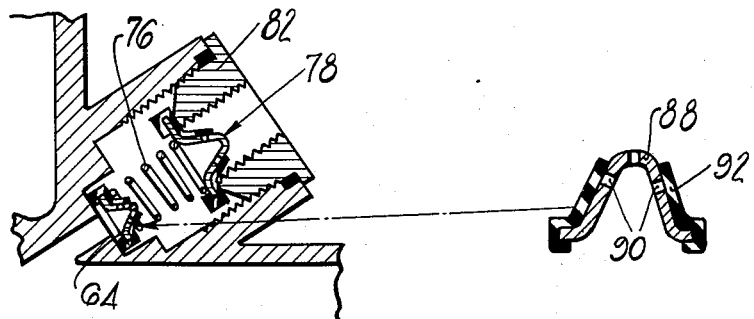
Figure 3 is an enlarged fragmentary view of another embodiment of the structure shown in Figure 2.

The embodiment shown in Figure 3 corresponds generally to that shown in Figure 2 differing principally in its check valve structure. The check valve shown in Figure 3 generally comprises a flanged conically shaped member quite similar to the back pressure valve 78. The conically shaped member 88 is provided with a plurality of openings 90 in its inclined or conically shaped surfaces and has an annular rubber facing or flap 92 positioned over its outer surface in such manner as to prevent return flow through the openings 90. The annular rubber facing 92 extends around the side edges of the members flange to form an annular seat on the bottom edge of the flange for abutment with the shoulder 64. The coil spring 76 is interpositioned between the check valve structure 88 and back pressure valve 78 to urge the check valve 88 against the shoulder 64 and at the same time supply the necessary force against the back pressure valve 78 for creating the previously mentioned predetermined back pressure.

Figure 4:
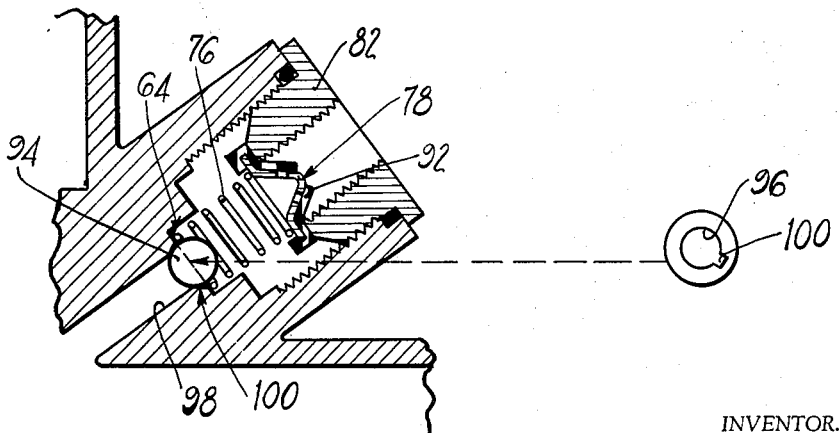
Figure 4 is still another embodiment of the structure shown in Figure 2.

The embodiment shown in Figure 4 corresponds generally to that device shown in Figure 2 but likewise differs principally in the construction of its check valve structure. The check valve in this embodiment comprises a ball valve 94 which is biased by gravity against a seat 96 formed at the juncture of the shoulder 64 and the lower inlet portion 98 of the discharge connection 62. The lower end of the coil spring 76 in this embodiment is positioned against the shoulder 64 and is of such a diameter as to act as a guide for the ball valve 94. Restriction to return flow in this embodiment is provided by means of a short groove or nick 100 in the seat 96; and has the advantage that dirt lodged between the ball valve 94 and the side edges of the groove 100 will be swept free during the next application of the brakes when the ball valve 94 is lifted off its seat.

While the preferred embodiments of the invention have been described in considerable detail, the invention is not limited to the particular constructions shown, and it is my intention to cover hereby all novel adaptations, modifications and arrangements thereof which come within the practice of those skilled in the art to which the invention relates and which come within the scope of the following claims.

I claim:

1. In an automotive braking system and the like: a brake applying fluid pressure motor of the type having a movable wall therein which is moved out of a retracted position by fluid pressure and which movable wall is continually biased toward its retracted position to create a back pressure, a fluid pressurizing chamber, a fluid displacement member in said fluid pressurizing chamber and movable inwardly from a retracted position to displace fluid from said chamber, said pressurizing chamber having a discharge passage communicating with said brake applying fluid pressure motor, a first valve seat in said discharge passage facing in the direction of flow towards said pressurizing chamber, a first two-way check valve for abutment with said first valve seat and having means which restricts return flow to said pressurizing chamber when seated thereagainst but which at all times permits flow towards said fluid pressure motor, a first spring biasing said first two-way check valve against said valve seat, a second valve seat facing in the direction of flow toward said fluid pressure motor, a second two-way check valve for abutment with said second valve seat, flow passage means including an orifice continually communicating opposite sides of said second two-way check valve, a reservoir of compensating fluid for said fluid pressurizing chamber, a passageway which communicates said reservoir with said pressurizing chamber in inward positions of said fluid displacement member from its retracted position, a check valve in said passageway preventing flow from said pressurizing chamber to said reservoir, a light second spring biasing said check valve closed, and a third spring biasing said displacement member toward its retracted position, said first spring and orifice being sized relative to said third spring to produce sufficient negative pressure during retraction of said fluid displacement member by said third spring to open said check valve against the action of said second spring.

2. In an automotive braking system and the like: a brake applying fluid pressure motor of the type having a movable wall therein which is moved out of a retracted position by fluid pressure and which movable wall is continually biased toward its retracted position to create a back pressure, a fluid pressurizing chamber, a fluid displacement member in said fluid pressurizing chamber movable inwardly from a retracted position to displace fluid from said chamber, said pressurizing chamber having a discharge passage communicating with said brake applying fluid pressure motor, said discharge passageway having an enlargement therein to provide first and second oppositely facing valve seats forming shoulders, the first of which surrounds the portion of said passageway leading to said fluid pressure motor and the second of which surrounds the portion leading to said fluid pressurizing chamber, a first two-way check valve for abutment with said first valve seat and which restricts return flow to said pressurizing chamber when seated thereagainst but which at all times permits flow towards said fluid pressure motor, a first spring biasing said first two-way check valve against its valve seat, a second two-way check valve for abutment with said second valve seat, said second two-way check valve being made from relatively thin material and having an orifice which at all times freely communicates its opposite sides, a reservoir of compensating fluid for said fluid pressurizing chamber, a passageway which communicates said reservoir with said pressurizing chamber in inward positions of said fluid displacement member from its retracted position, a check valve in said passageway preventing flow from said pressurizing chamber to said reservoir, a light second spring biasing said third valve closed, and a third spring biasing said displacement member towards its retracted position, said first spring and orifice being sized relative to said back pressure of said fluid pressure motor and said third spring to produce sufficient negative pressure during retraction of said fluid displacement member by said third spring to open said check valve against the action of said second spring.

References Cited in the file of this patent

UNITED STATES PATENTS

| | | |
|---|---|---|
| 1,885,121 | Loweke | Nov. 1, 1932 |
| 1,990,493 | Loughead et al. | Feb. 12, 1935 |
| 2,232,113 | Katcher | Feb. 18, 1941 |
| 2,282,333 | Masteller | May 12, 1942 |
| 2,547,233 | Seppmann | Apr. 3, 1951 |
| 2,574,969 | Heidloff | Nov. 13, 1951 |
| 2,657,537 | Oakley | Nov. 3, 1953 |
| 2,663,540 | Erickson | Dec. 22, 1953 |

FOREIGN PATENTS

| | | |
|---|---|---|
| 872,682 | France | Feb. 23, 1942 |
| 726,863 | Germany | Oct. 22, 1942 |
| 856,264 | Germany | Nov. 20, 1952 |
| 310,608 | Italy | Aug. 26, 1933 |